（12） United States Patent
Patterson

(10) Patent No.: US 8,809,665 B2
(45) Date of Patent: Aug. 19, 2014

(54) ELECTRONIC PERCUSSION GESTURES FOR TOUCHSCREENS

(75) Inventor: Daniel P. Patterson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 13/038,308

(22) Filed: Mar. 1, 2011

(65) Prior Publication Data

US 2012/0223891 A1  Sep. 6, 2012

(51) Int. Cl.
*G10H 1/18* (2006.01)

(52) U.S. Cl.
USPC ............................................. 84/615; 84/653

(58) Field of Classification Search
USPC .................................. 84/600–602, 615–653
See application file for complete search history.

(56) References Cited

U.S. PATENT DOCUMENTS

| | | | | |
|---|---|---|---|---|
| 4,526,078 A * | 7/1985 | Chadabe | | 84/602 |
| 4,716,804 A * | 1/1988 | Chadabe | | 84/653 |
| 6,201,173 B1 * | 3/2001 | Black | | 84/422.1 |
| 6,245,984 B1 * | 6/2001 | Aoki et al. | | 84/611 |
| 6,390,923 B1 * | 5/2002 | Yoshitomi et al. | | 463/43 |
| 6,607,436 B1 * | 8/2003 | Ueshima et al. | | 463/3 |
| 7,060,887 B2 * | 6/2006 | Pangrle | | 84/724 |
| 7,088,343 B2 * | 8/2006 | Smith et al. | | 345/173 |
| 7,271,328 B2 * | 9/2007 | Pangrle | | 84/464 R |
| 7,682,237 B2 * | 3/2010 | Ueshima et al. | | 463/7 |
| 7,842,877 B2 * | 11/2010 | Charles | | 84/615 |
| 7,960,639 B2 * | 6/2011 | Mizuhiki et al. | | 84/622 |
| 8,030,567 B2 * | 10/2011 | Ludwig | | 84/645 |
| 8,093,486 B2 * | 1/2012 | Behringer et al. | | 84/615 |
| 8,163,992 B2 * | 4/2012 | Charles | | 84/615 |
| 8,173,884 B2 * | 5/2012 | Gatzsche et al. | | 84/615 |
| 8,207,435 B2 * | 6/2012 | Charles | | 84/471 R |
| 8,367,922 B2 * | 2/2013 | Jung et al. | | 84/610 |
| 2004/0200338 A1 * | 10/2004 | Pangrle | | 84/724 |
| 2005/0096132 A1 * | 5/2005 | Ueshima et al. | | 463/37 |
| 2006/0034043 A1 * | 2/2006 | Hisano et al. | | 361/681 |
| 2006/0174756 A1 * | 8/2006 | Pangrle | | 84/724 |
| 2007/0221046 A1 * | 9/2007 | Ozaki et al. | | 84/612 |
| 2007/0229477 A1 * | 10/2007 | Ludwig | | 345/173 |
| 2007/0252327 A1 * | 11/2007 | Ueshima et al. | | 273/148 B |
| 2008/0110323 A1 * | 5/2008 | Bergfeld et al. | | 84/626 |
| 2009/0091543 A1 * | 4/2009 | Camp et al. | | 345/173 |
| 2009/0174677 A1 * | 7/2009 | Gehani et al. | | 345/173 |
| 2009/0239517 A1 * | 9/2009 | Ota | | 455/418 |
| 2010/0287471 A1 * | 11/2010 | Nam et al. | | 715/702 |
| 2010/0288108 A1 * | 11/2010 | Jung et al. | | 84/610 |
| 2010/0319519 A1 * | 12/2010 | Takehisa et al. | | 84/723 |
| 2011/0100198 A1 * | 5/2011 | Gatzsche et al. | | 84/615 |
| 2011/0134061 A1 * | 6/2011 | Lim | | 345/173 |
| 2011/0316793 A1 * | 12/2011 | Fushiki | | 345/173 |

(Continued)

*Primary Examiner* — David S. Warren
(74) *Attorney, Agent, or Firm* — Fish & Richardson P.C.

(57) ABSTRACT

Methods, computer program products, and systems for receiving gestures and producing percussion instrument signals are disclosed. An exemplary method includes receiving a gesture on an area of a touchscreen representing a percussion instrument and generating a signal based on the gesture and area. The gesture can be a single point initiation touch on an area, and a drag into another area. The gesture can be a two-touch point initiation touch on a first area, and a change in distance between the points to change a first parameter such as repeat rate. Such gestures can further include translation of the touch points as a group along an axis to change a second parameter such as volume, pitch, or reverb.

24 Claims, 13 Drawing Sheets

(56) References Cited

U.S. PATENT DOCUMENTS

| | | | |
|---|---|---|---|
| 2012/0011989 A1* | 1/2012 | Takahashi | 84/626 |
| 2012/0139861 A1* | 6/2012 | Jung et al. | 345/173 |
| 2012/0223903 A1* | 9/2012 | Ludwig | 345/173 |
| 2012/0235940 A1* | 9/2012 | Ludwig | 345/173 |
| 2012/0280928 A1* | 11/2012 | Ludwig | 345/173 |
| 2013/0118337 A1* | 5/2013 | Behringer et al. | 84/615 |
| 2013/0118338 A1* | 5/2013 | Wallace et al. | 84/626 |
| 2013/0152768 A1* | 6/2013 | Rapp | 84/634 |

* cited by examiner

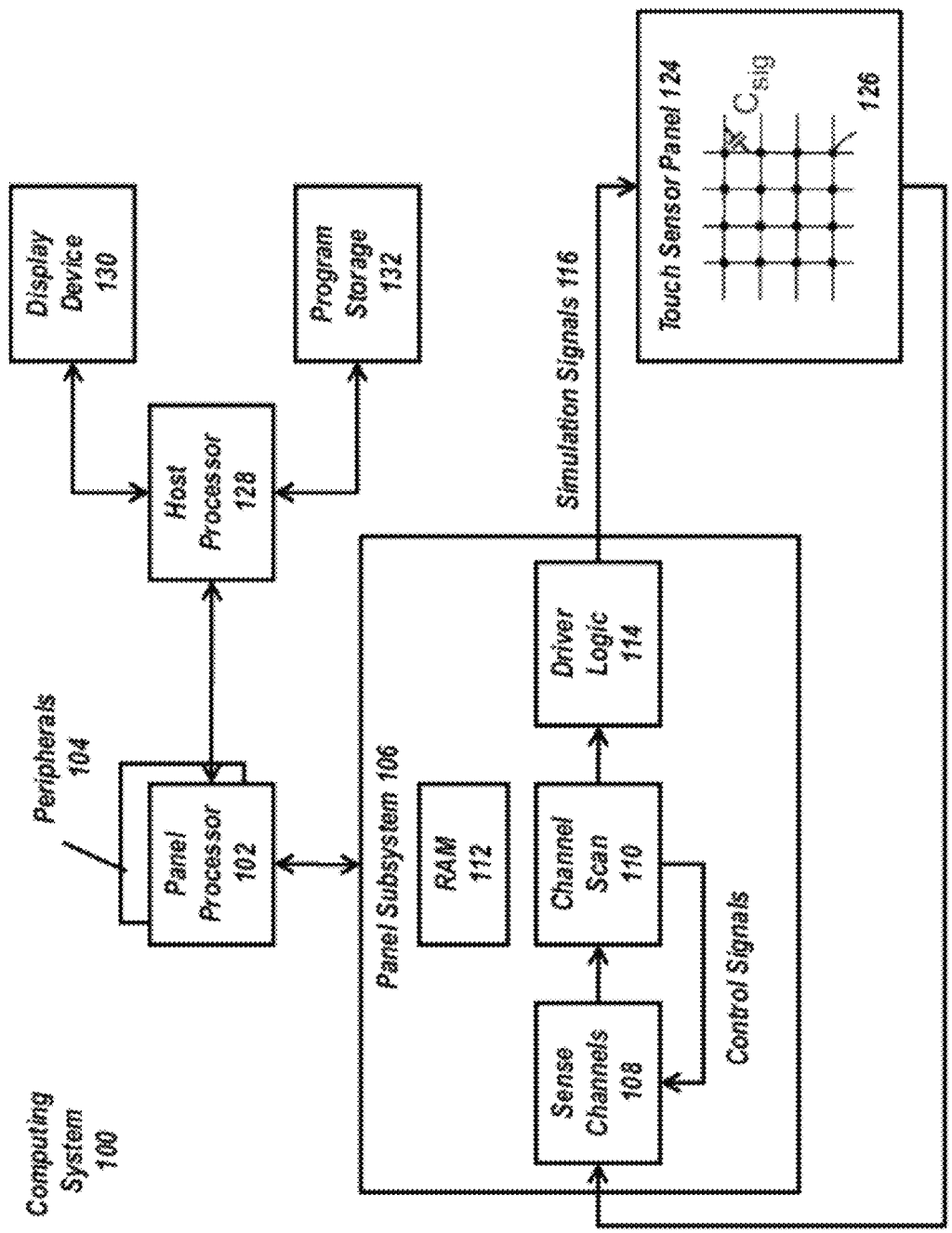

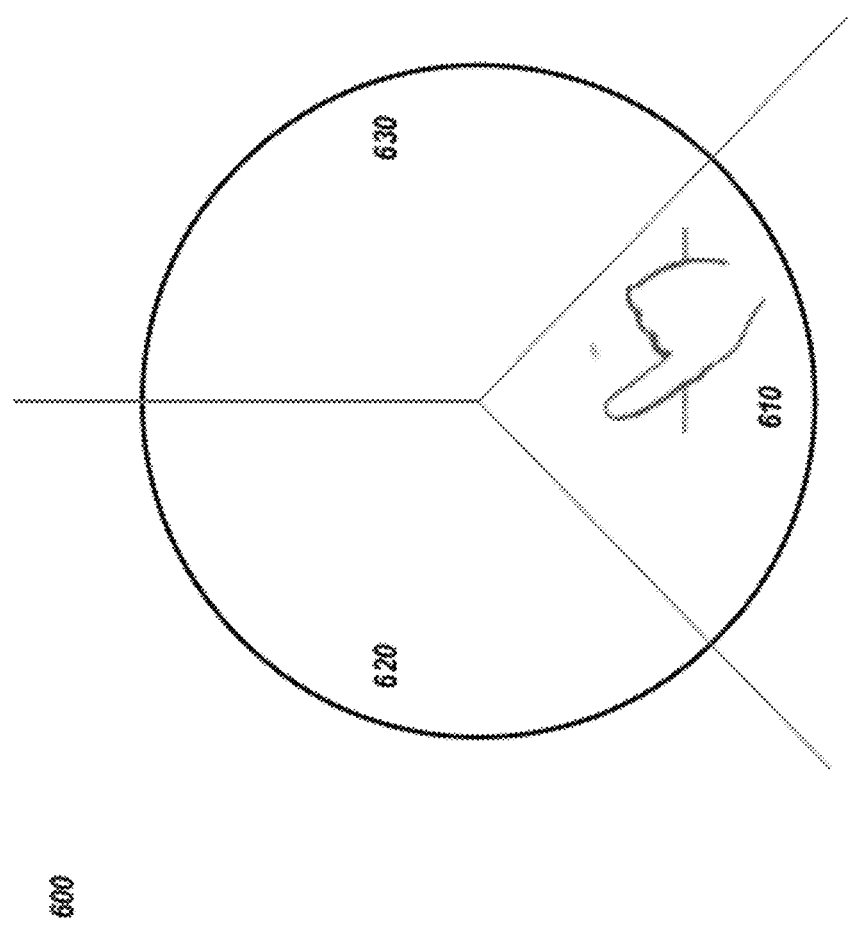

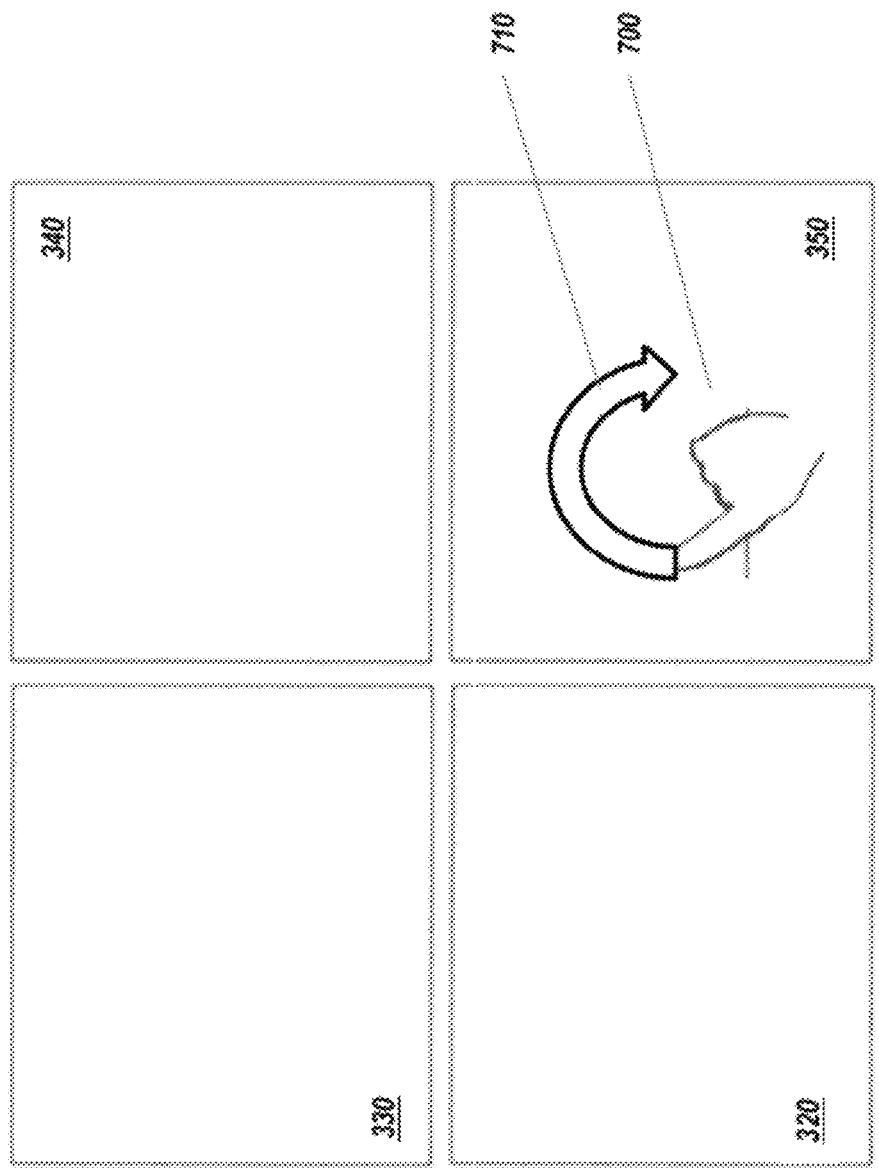

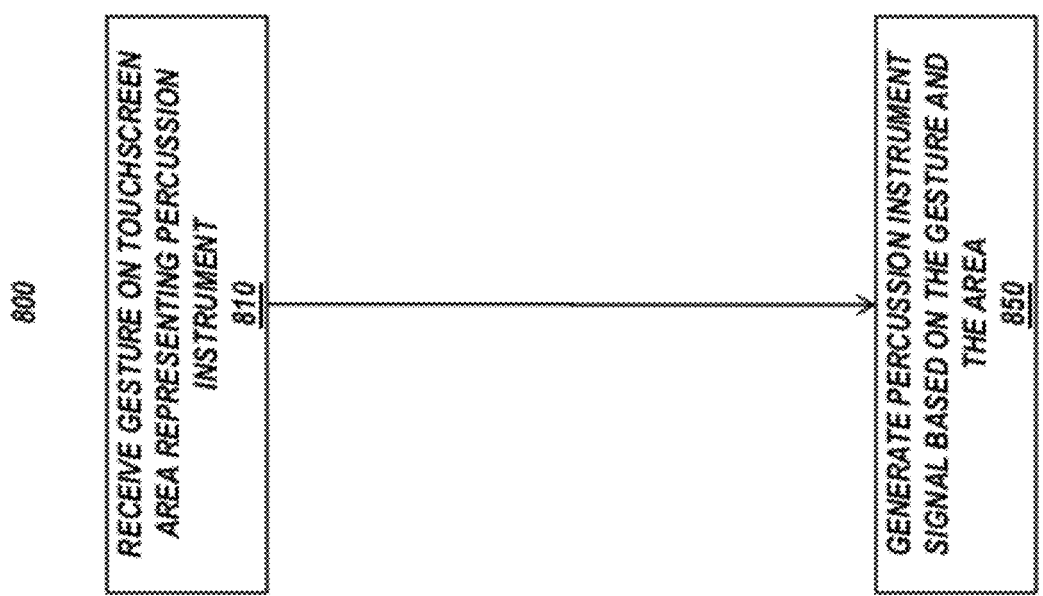

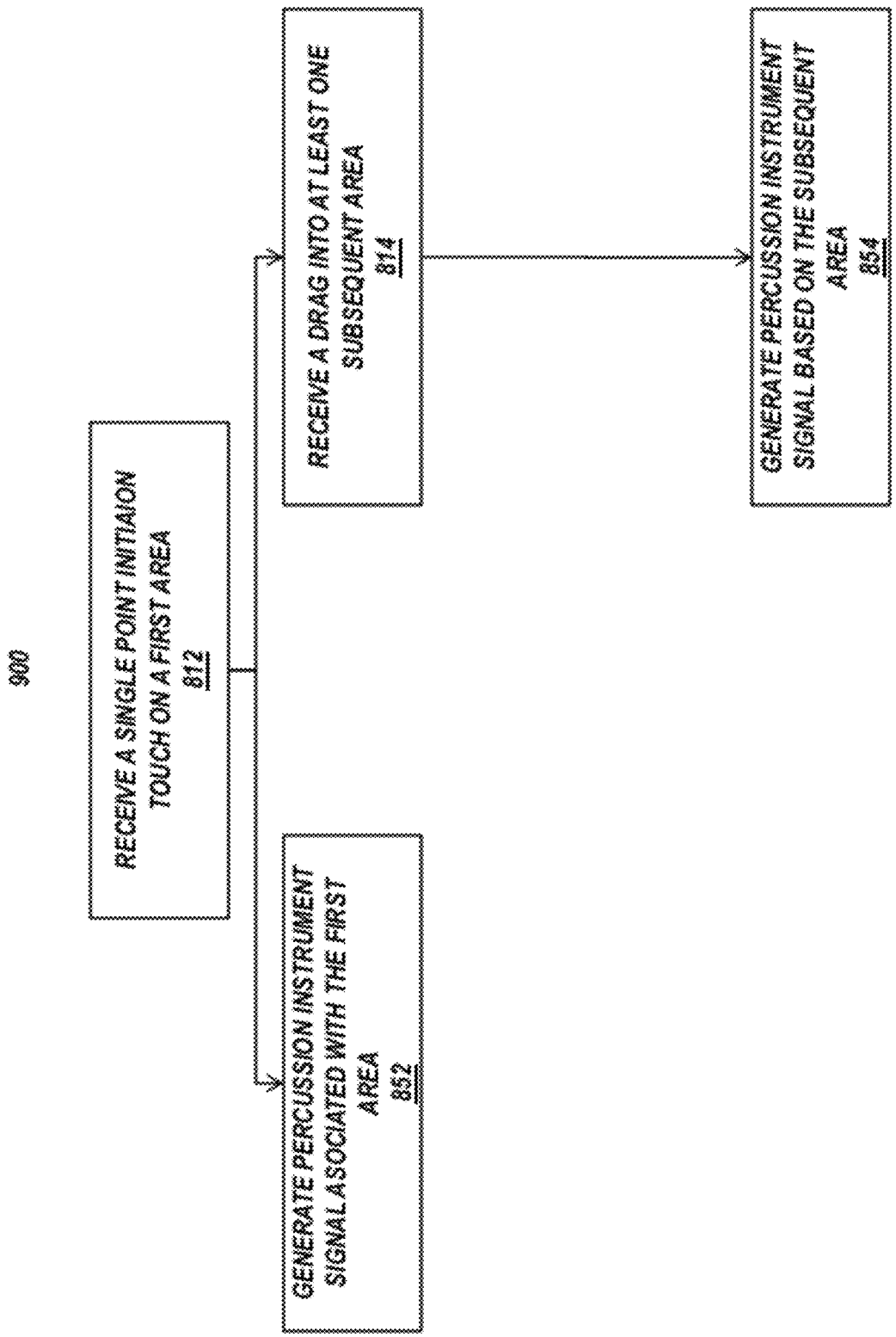

ELECTRONIC PERCUSSION GESTURES FOR TOUCHSCREENS

FIELD OF THE TECHNOLOGY

The technology disclosed herein (the "technology") relates to electronic musical instruments. More specifically, the technology relates to gestures for a touchscreen of an electronic percussion instrument.

BACKGROUND

Dedicated electronic percussion instruments, e.g., electronic drums, having a drum pad are known. An electronic drum is a percussion instrument in which the sound is generated by an electronic waveform generator or sampler instead of by acoustic vibration. Typically, when an electronic drum pad is struck (i.e., triggered), a voltage change is caused in an embedded piezoelectric transducer (piezo) or force sensitive resistor (FSR). The resultant signals are translated into digital waveforms, which produce the desired percussion sound assigned to that particular trigger pad. Most newer drum modules have trigger inputs for 2 or more cymbals, a kick, 3-4 toms, a dual-zone snare (head and rim), and a hi-hat. The hi-hat has a foot controller which produces open and closed sounds with some models offering variations in-between.

Percussion instrument functionality can be implemented on devices having a touchscreen, but without a dedicated drum pad. Examples of such devices include tablet computers and smart phones. However, the touchscreen of such devices are typically "on/off" and not velocity sensitive like most drum pads in dedicated electronic percussion instruments. This may inhibit the range of expression of such devices to less than that of acoustic drums or dedicated electronic percussion instruments. Also, touchscreen electronic percussion instruments typically do not take advantage of some of the characteristics of dedicated electronic percussion instruments. Further, the limited user interface space typically available in touchscreen devices limits the number of controls that can be offered concurrently. A need exists to provide gesture interfaces for percussion instrument functionality implemented on devices having a touchscreen interface, but no drum pad, and a limited touch surface area.

SUMMARY

Disclosed are methods, computer program products, and systems for receiving gestures and producing percussion instrument signals. An exemplary method includes receiving a gesture on an area of a touchscreen representing a percussion instrument. The exemplary method further includes generating a signal based on the gesture and area. The gesture can be a single point initiation touch on an area, and a drag into another area. Such signal is the signal associated with the first area and the signal associated with each subsequent area upon entering the subsequent area. The gesture can be a two-touch point initiation touch on a first area, and a change in distance between the points. Then the signal is the signal associated with the first area, and changing a first parameter of the signal upon a change in the distance. The first parameter can be repeat rate. Such gestures can further include translation of the touch points as a group along an axis to change a second parameter such as volume, pitch, or reverb.

BRIEF DESCRIPTION OF THE DRAWINGS

FIG. 1 illustrates components that can be associated with systems of the technology;

FIG. 6 illustrates exemplary gestures associated with the technology;

FIG. 7 illustrates exemplary gestures associated with the technology;

FIG. 8 illustrates methods of the technology;
FIG. 9 illustrates methods of the technology.

DETAILED DESCRIPTION

Figure 2C:
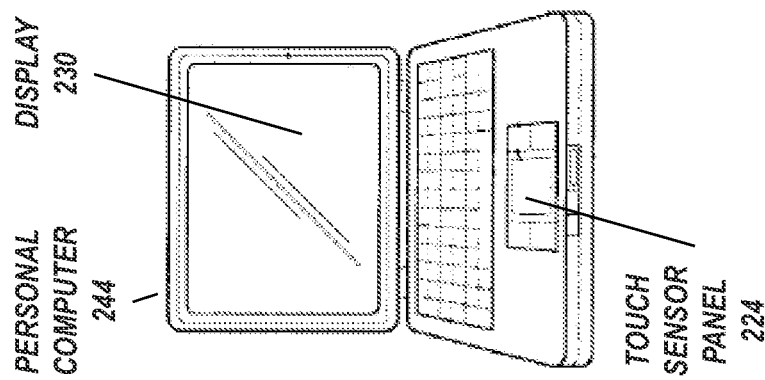
FIGS. 2A-2C illustrate exemplary devices associated with the technology.

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

FIG. 1 illustrates exemplary computing system 100 that can include one or more of the implementations of the technology described herein. Computing system 100 can include one or more panel processors 102 and peripherals 104, and panel subsystem 106 associated with an input device (which may correspond to input device 124). Peripherals 104 can include, but are not limited to, random access memory (RAM) or other types of memory or storage, watchdog timers and the like. Panel subsystem 106 can include, but is not limited to, one or more sense channels 108, channel scan logic 110 and driver logic 114. Channel scan logic 110 can access RAM 112, autonomously read data from the sense channels and provide control for the sense channels. In addition, channel scan logic 110 can control driver logic 114 to generate stimulation signals 116 at various frequencies and phases that can be selectively applied to drive lines of touch sensor panel 124. In some implementations, panel subsystem 106, panel processor 102 and peripherals 104 can be integrated into a single application specific integrated circuit (ASIC).

Touch sensor panel 124 can include a capacitive sensing medium having a plurality of drive lines and a plurality of sense lines, although other sensing media also can be used. Each intersection of drive and sense lines can represent a capacitive sensing node and can be viewed as picture element (pixel) 126, which can be particularly useful when touch sensor panel 124 is viewed as capturing an "image" of touch. In other words, after panel subsystem 106 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel). Each sense line of touch sensor panel 124 can drive sense channel 108 in panel subsystem 106. The touch sensor panel can enable multi-touch gesture detection so that shapes can be generated and modified according to implementations of the technology.

Computing system 100 also can include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, prompting the generation of a signal corresponding to a sound of a percussion instrument, and/or the like. Host processor 128 also can perform additional functions that may not be related to panel processing, and can be coupled to program storage 132 and display device 130 (which may correspond to system 100) such as an LCD display for providing a UI to a user of the device. Display device 130 together with touch sensor panel 124, when located partially or entirely under the touch sensor panel, can form a touchscreen.

Note that one or more of the functions described above can be performed by instructions (e.g., programming, software, firmware) stored in memory (e.g. one of the peripherals 104 in FIG. 1) and executed by panel processor 102, or stored in program storage 132 and executed by host processor 128. The instructions also can be stored and/or transported within any computer-readable storage medium for use by or in connection with an instruction execution system, apparatus, or device (hereinafter referred to as "instruction execution system"), such as a computer-based system, processor-containing system, or other system that can fetch the instructions from the memory. In the context of this document, a "computer-readable storage medium" can be any medium that can contain or store the program of instructions for use by or in connection with the instruction execution system. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions also can be propagated within any transport medium for use by or in connection with an instruction execution system, such as a computer-based system, processor-containing system, or other system that can fetch the instructions from the memory and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2B:
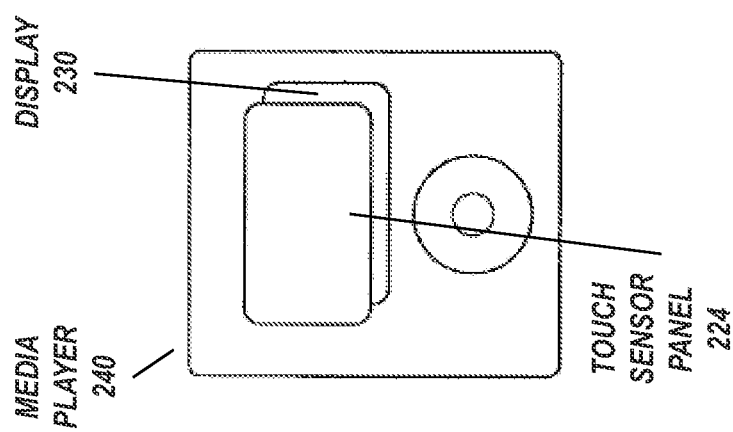
Figure 2A:
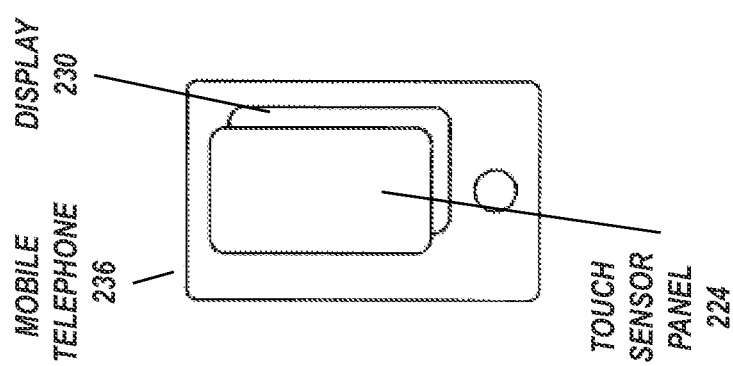

FIG. 2A illustrates exemplary mobile telephone 236 that can include touch sensor panel 224 and display device 230, with the touch sensor panel being configured to enable multi-touch interface according to implementations of the technology.

FIG. 2B illustrates exemplary digital media player 240 that can include touch sensor panel 224 and display device 230, with the touch sensor panel being configured to enable multi-touch shape drawing according to implementations of the technology.

FIG. 2C illustrates exemplary personal computer 244 that can include touch sensor panel (trackpad) 224 and display device 230, with the touch sensor panel and/or display of the personal computer (in implementations where the display is part of a touchscreen) being configured to enable multi-touch shape drawing according to implementations of the technology.

The mobile telephone, media player and personal computer of FIGS. 2A, 2B and 2C can achieve an improved user interface experience associated with implementations of the technology. Further, devices such as tablet computers can be employed in implementations of the technology. In some implementations of the technology, the touch sensor panel and the display are not co-located.

A touchscreen is an electronic visual display that can detect the presence and location of a touch (or multiple touches) within the touchscreen area. The term generally refers to touching the display of the device with a finger or hand. Touchscreens also can sense other passive objects, such as a stylus. Touchscreen is common in devices such as all-in-one computers, tablet computers, and smartphones. Touchsreens enable one to interact directly with what is displayed, rather than indirectly with a cursor controlled by a mouse or touchpad. Touchscreens also let one do so without requiring an intermediate device that would need to be held in the hand. Such displays can be attached to computers, or to networks as terminals. They also play a prominent role in the design of digital appliances such as the personal digital assistant (PDA), satellite navigation devices, mobile phones, and video games. Multi-touch touch-sensitive panels can detect multiple touches (touch events or contact points) that occur at about the same time (and at different times), and identify and track their locations.

Dedicated electronic percussion instruments, e.g., electronic drums, having a drum pad are known. An electronic drum is a percussion instrument in which the sound is generated by an electronic waveform generator or sampler instead of by acoustic vibration. Typically, when an electronic drum pad is struck (i.e., triggered), a voltage change is caused in the embedded piezoelectric transducer (piezo) or force sensitive resistor (FSR). The resultant signals are translated into digital waveforms, which produce the desired percussion sound assigned to that particular trigger pad. Most newer drum modules have trigger inputs for 2 or more cymbals, a kick, 3-4 toms, a dual-zone snare (head and rim), and a hi-hat. The hi-hat has a foot controller which produces open and closed sounds with some models offering variations in-between.

Percussion instrument functionality can be implemented on devices having a touchscreen, but without a dedicated drum pad. Examples of such devices include tablet computers and smart phones, e.g., as described above. However, the touchscreen of such devices are typically "on/off" and not velocity sensitive like most drum pads in dedicated electronic percussion instruments. This may inhibit the range of expression of such devices to less than that of acoustic drums or dedicated electronic percussion instruments. Also, touchscreen electronic percussion instruments typically do not take advantage of some of the characteristics of dedicated electronic percussion instruments. Further, the limited user interface space typically available in touchscreen devices limits the number of controls that can be offered concurrently. A need exists to provide gesture interfaces for percussion instrument functionality implemented on devices having a touchscreen interface, but no drum pad, and a limited touch surface area.

In some implementations, the technology comprises one or more of computer-implemented methods, computer program products, and systems for receiving gestures and producing percussion instrument signals. The gestures can be one or more of single touch and multi-touch. The signals can be acoustic, such as where a device of the technology includes a speaker. The signals can be electric, such as where a device of the technology can be connected, directly or indirectly, to a speaker, and/or where a device of the technology records data related to the signal for playing at a later time.

Figure 3:
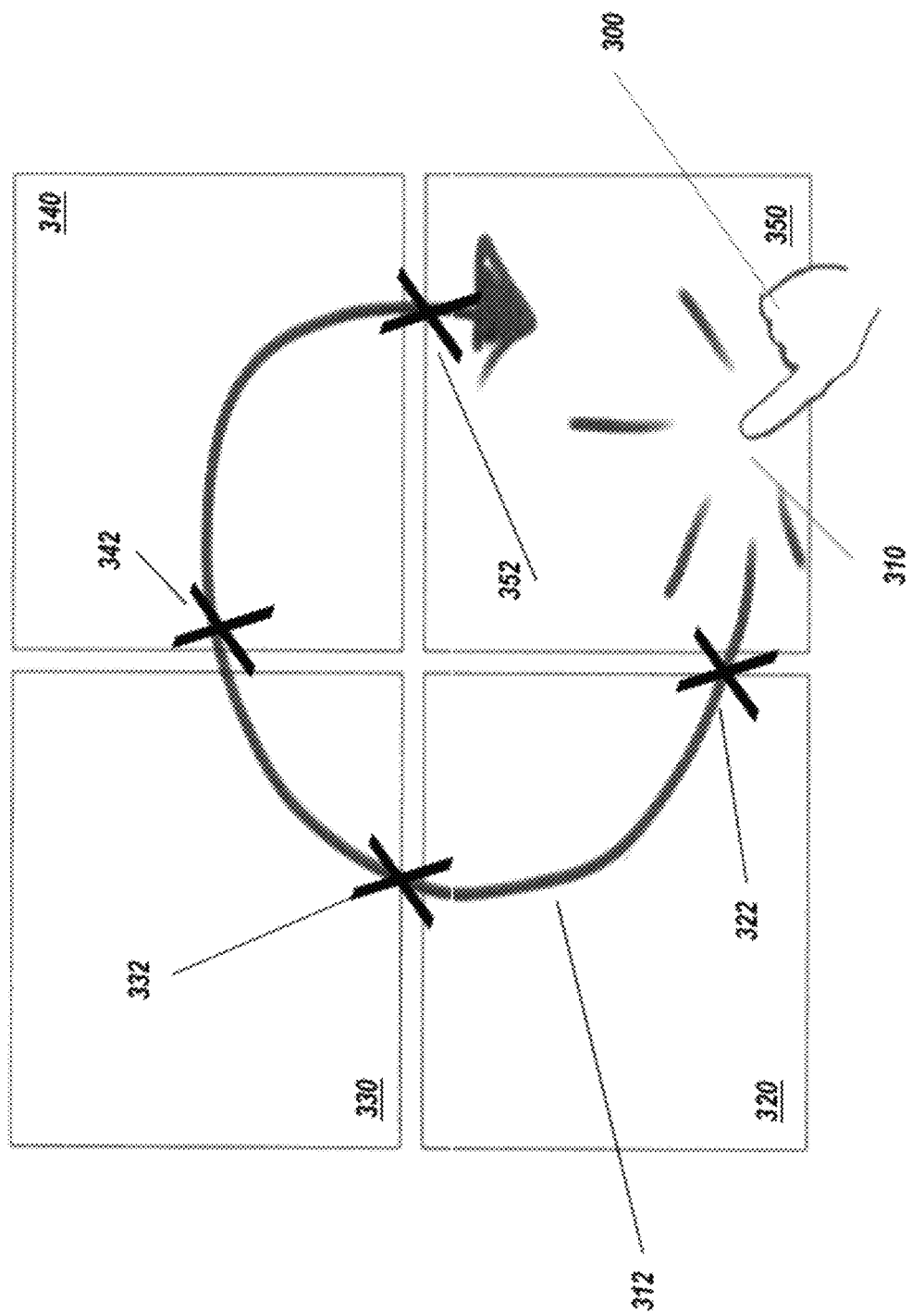
FIG. 3 illustrates exemplary gestures associated with the technology.

FIG. 3 illustrates a gesture 300 for generating a series of single drum hits. The gesture 300 is a single touch in touchscreen area 350 initiating at 310 with drag (indicated by path 312) across distinct touchscreen areas 320, 330, 340, and back to 350. Each touchscreen area 320-350 can represent a different percussion instrument. As the drag 312 enters each area at a point (indicated by "X"), the technology responds with the signal programmed or selected for that area. For example, as the drag enters area 330 at point 332, the technology generates a signal corresponding to the percussion sound programmed/selected for area 330. In the depicted example, a signal is generated upon each of the initial touch 310 and points 322, 332, 342, and 352 along the drag path 312.

Gesture-Enhanced Single-Touch, also known as "Dual Control", "Gesture Touch" and often "Dual-Touch" describes the ability of a touchscreen to register certain two-finger gestures, even though the display hardware does not have full multi-touch capabilities. A very common application is the pinch-to-zoom gesture, which allows the user to zoom in or out by moving two fingers farther apart or closer together while touching the display.

Figure 4:
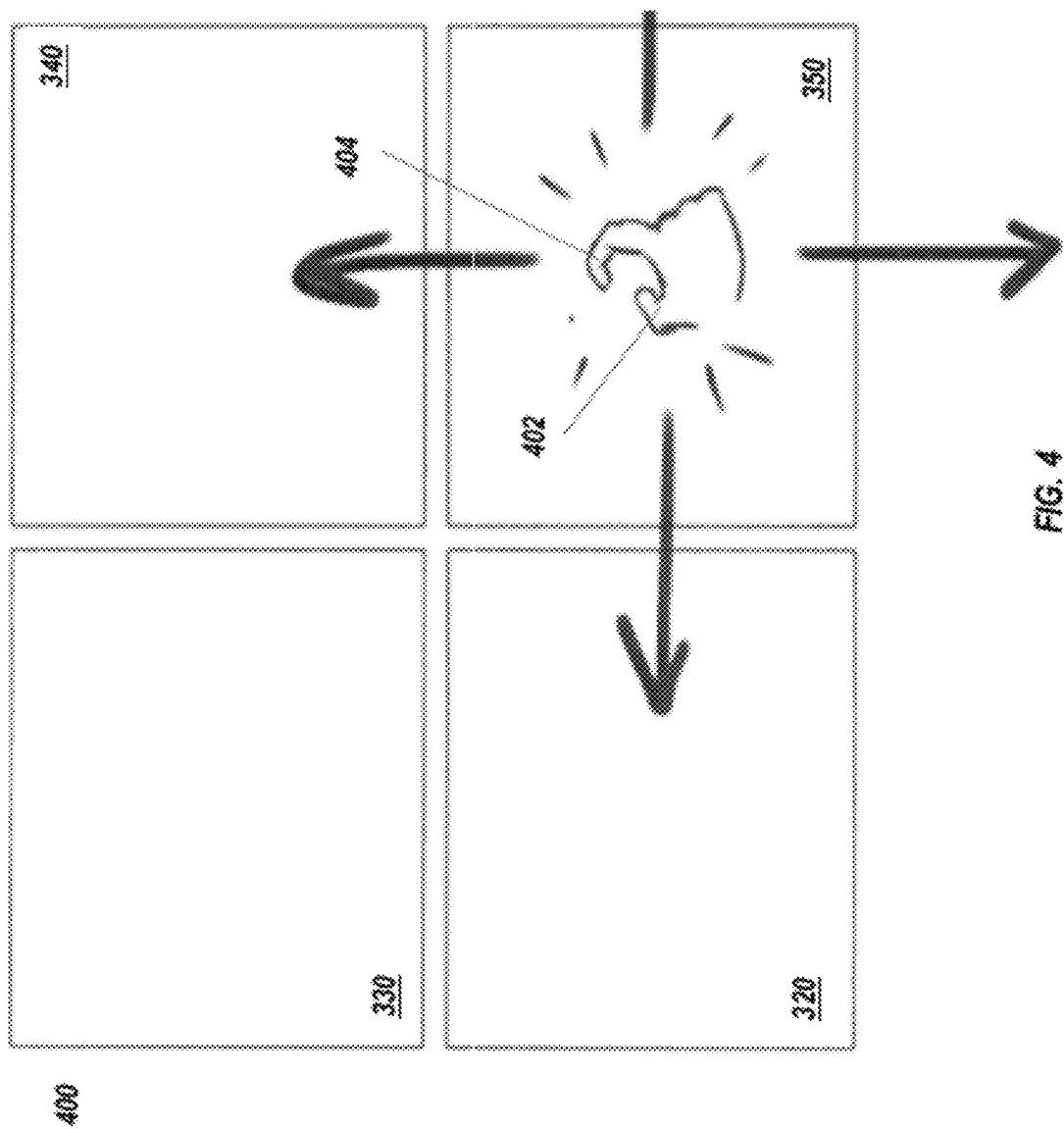
FIG. 4 illustrates exemplary gestures associated with the technology.
Figure 5B:
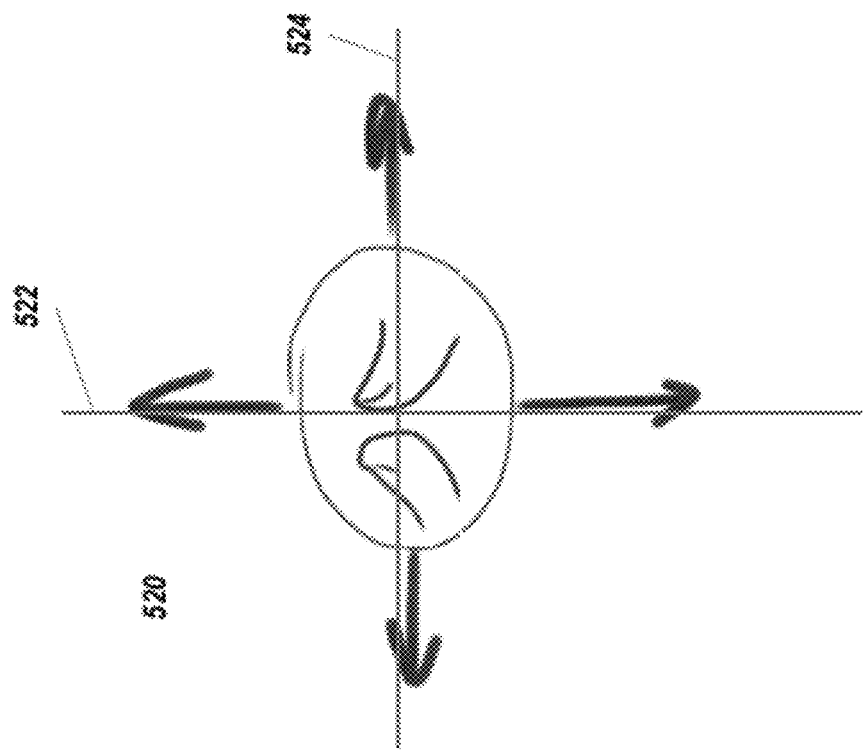
FIGS. 5A-5B illustrate details of exemplary gestures associated with the technology.
Figure 5A:
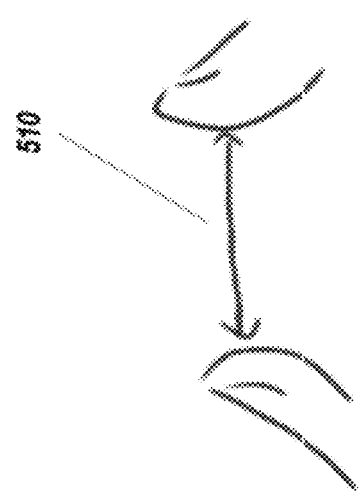

FIG. 4 and FIGS. 5A-5B illustrate a gesture 400 of the technology that can be implemented as Gesture-Enhanced Single-Touch, Dual Touch, or multi-touch, depending on the capabilities of the underlying hardware. The gesture 400 is initiated by a two-point (402, 404) touch, shown in this example initiated on area 350 using a thumb at 402 and an index finger at 404. Initiation in area 350 causes the gesture to operate on the percussion sounds programmed for area 350.

FIG. 5A illustrates that the distance 510 between the points can be varied while maintaining contact with the touchscreen to vary a first parameter of the signal produced by the touch. In some implementations, the first parameter is the repeat rate of a repeating signal associated with the area. In those implementations the repeat rate can be increased by increasing the distance between the touch points, and decreased by decreasing the distance between the touch points. Repeat rates, for example, can vary continuously with the distance between the touch points or can vary in discrete increments (e.g., 1/16 note, 1/32 note).

FIG. 5B illustrates a group translation of the touch 520 along one of two orthogonal axes, 522 and 524, used to vary a second and a third parameter of the initiated signal. In some implementations of the technology, movement of the group up and down the vertical axis can increase and decrease, respectively, the volume of the signal. In some implementations of the technology, movement along a substantially horizontal axis controls pitch in a similar fashion.

In some implementations, the technology accepts a group rotation (e.g., rotation of an axis formed by the two touch points) to vary a fourth parameter of the signal produced by the touch. In some implementations, once the two-point touch is initiated, the touch can be translated and rotated as a group outside the area of the initial touch and still maintain the signal produced by the initial touch.

FIG. 6 illustrates a touchscreen area 600 that can be used for a snare and high hat. Though FIG. 6 shows a circle of three (3) areas 610, 620, and 630 of substantially equal size and of the illustrated orientation, the technology is applicable to other shapes, other number of areas, other sizes of areas, and other orientations. In the illustrated implementation, and for a snare drum, touching the bottom section 610 produces a side stick hit, touching the left section 620 produces a rim shot, and touching the right section 630 produces a snare sound. In the illustrated implementation, and for a hi-hat, the figure is rotated 180 degrees and touching the now-top section 610 produces a pedal hi-hat hit, touching the now-right section 620 produces a closed hi-hat hit, and touching the now-left section 630 produces an open hi-hat hit. A "positional" approach, e.g., dividing a touchpad asset for a single percussion instrument into areas, can be used to produce other effects such as pitch variation, filtering, and reverb. The approach described in conjunction with FIG. 6 also can be applied to cymbals (edge strikes, bow strikes, bell strikes).

FIG. 7 illustrates a gesture 700 of the technology for a brush stroke. The gesture 700 can be initiated by touching the pad area to be brushed, e.g., 350, and continuing the gesture in a generally circular path 710. In some implementations, the brush signal can be produced for as long as the pad continues to receive a generally circular path while maintaining contact with the pad 350.

In each implementation, gestures can be combined. For example, touching the side stick hit area 610 of the snare in FIG. 6 with two fingers that are moved apart from each other, and move up as a group can produce an increasing-rate, increasing volume, side stick hit signal. Relating the gesture to sound parameters can be via formula, look-up table, etc. Position within an area can be expressed in x-y coordinates, a vector from a reference given as magnitude and angle.

Referring to FIG. 8, methods 800 of the technology are illustrated. In computer-implemented methods of the technology, a gesture is received (810) on at least one area of a touchscreen of an electronic device. The area can represent a percussion instrument. A percussion instrument signal based on the gesture and the area is generated (850).

Referring to FIG. 9, in some implementations such as illustrated method 900, the received gesture is a single point initiation touch on a first area (812), and a drag into at least one subsequent area (814) as described in reference to FIG. 3. In those implementations, the technology generates the signal associated with the first area upon receiving the single point initiation touch (852), and generates the signal associated with each subsequent area substantially upon the drag entering into each subsequent area (854).

Figure 10:
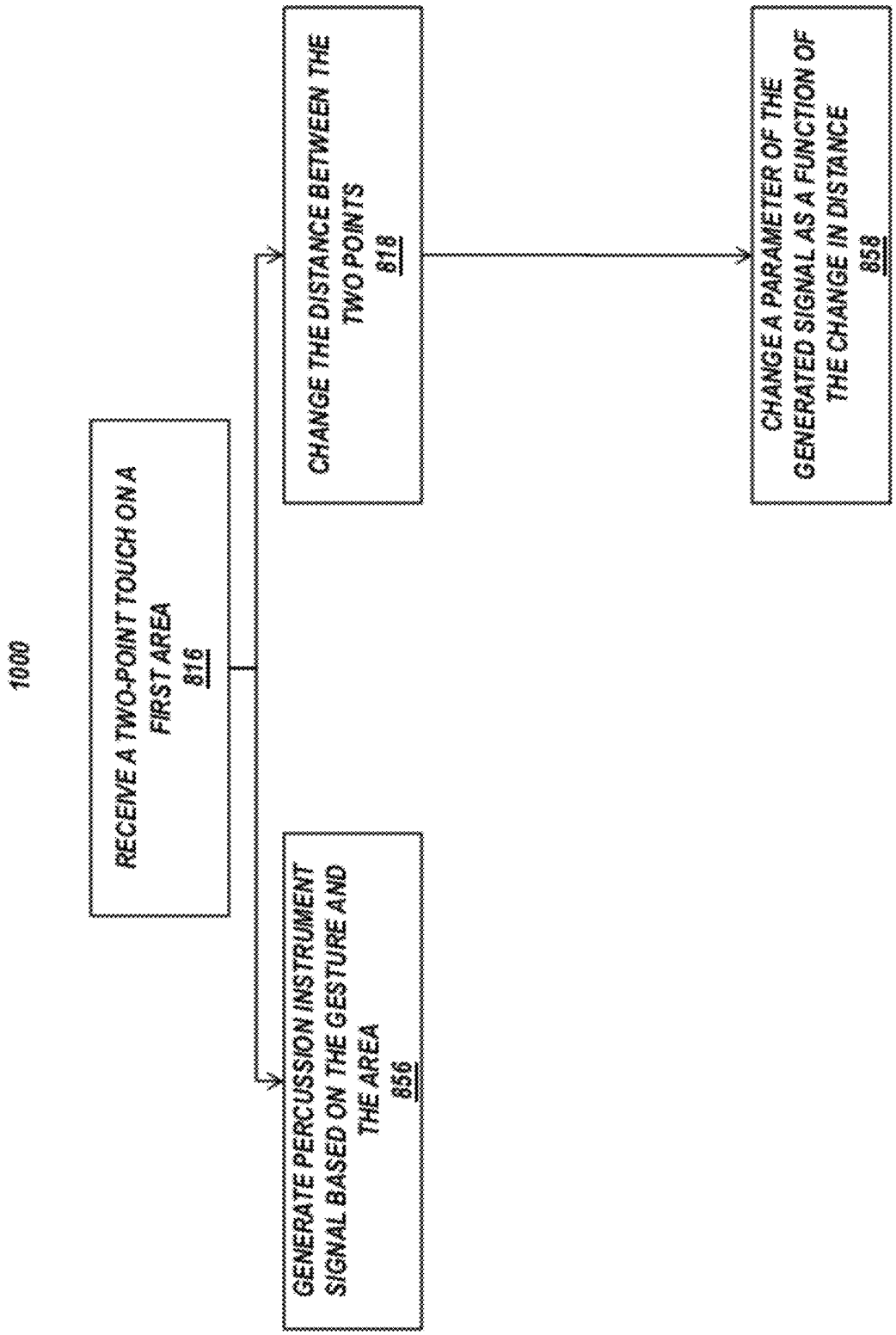
FIG. 10 illustrates methods of the technology.

Referring to FIG. 10, in some implementations of the technology such as illustrated method 1000, the received gesture can be a two-touch point initiation touch on a first area (816), and a change in the distance between the two touch points (818) as described in reference to FIG. 4 and FIGS. 5A-5B. In those implementations, the technology generates the signal associated with the first area upon receiving the initiation touch (856), and changes a first parameter of the generated signal upon a change in the distance between the two touch points (858). In some implementations, the first parameter is the signal repeat rate.

Figure 11:
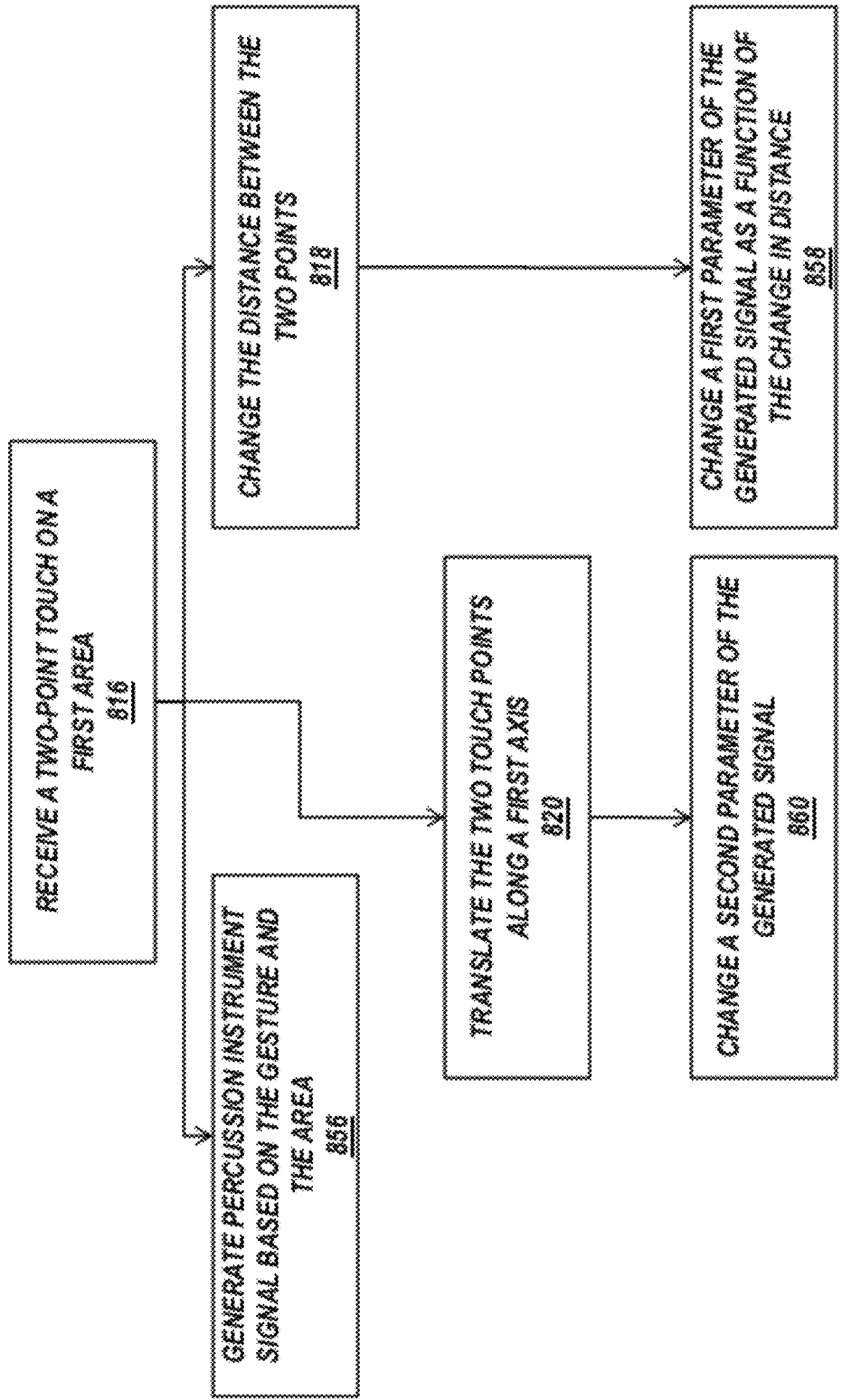
FIG. 11 illustrates methods of the technology.

Referring to FIG. 11, in further implementations of the technology show in FIG. 10 as method 1100, after the initiation touch, the gesture includes translation of the two touch points substantially as a group along a first axis (820). In those implementations, a second parameter of the generated signal is changed upon a translation of the group along the first axis (860). In some implementations, the first parameter comprises signal repeat rate, and the second parameter comprises one of: signal volume, signal pitch, and signal reverb.

Figure 12:
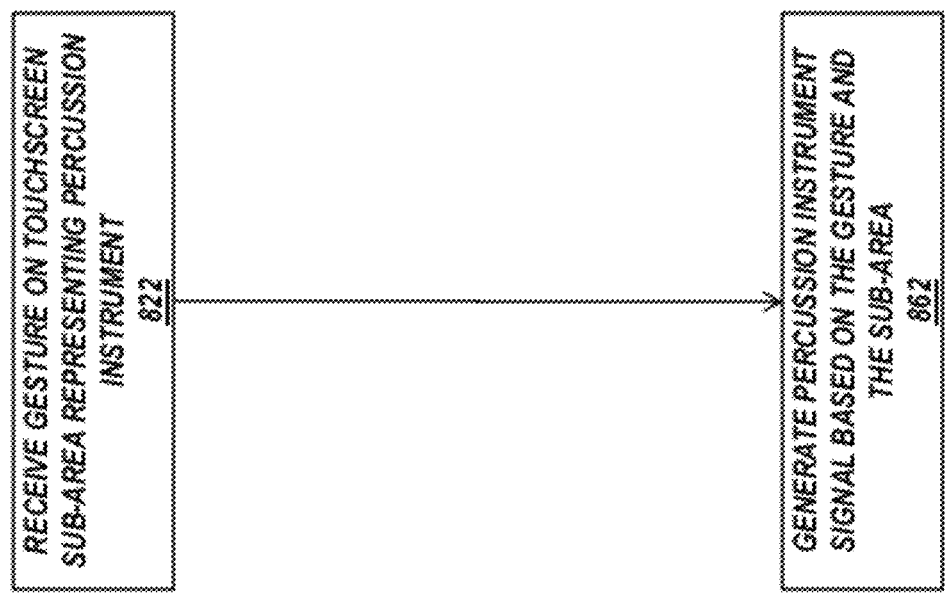
FIG. 12 illustrates methods of the technology.

Referring to FIG. 12, methods 1200 of the technology are illustrated in which a first touchscreen area represents a single percussion instrument (822), and is divided into at least two sub-areas. Each sub-area represents a different strike of the instrument. In those implementations, a gesture can be received on a sub-area, and a signal can be generated corresponding the signal associated the gestured sub-area (862). In some such implementations, the instrument is a snare drum and a first sub-area represents a snare strike, a second sub-area represents a side stick strike, and a third sub-area represents a rim shot.

Figure 13:
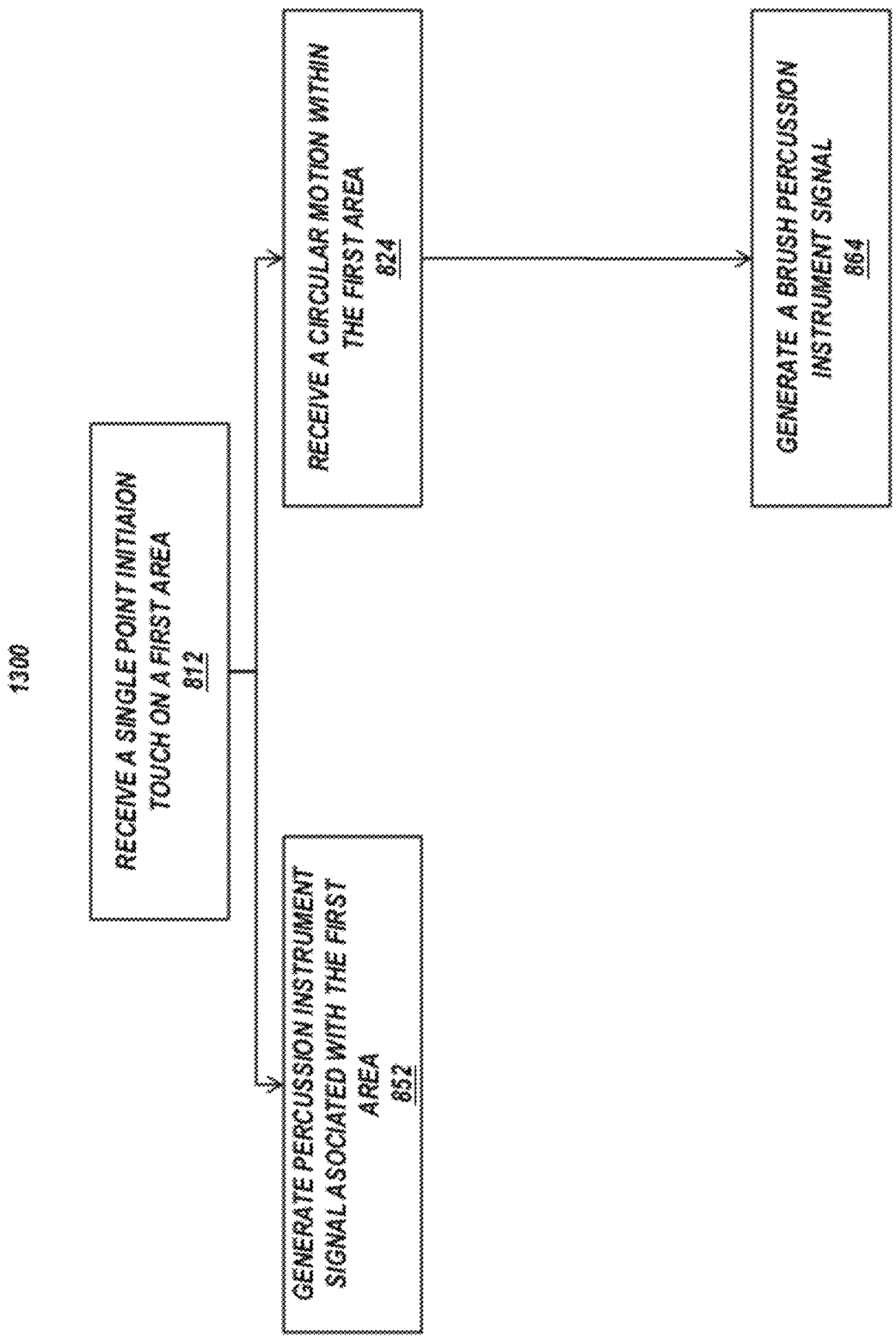
FIG. 13 illustrates methods of the technology.

Referring to FIG. 13, methods 1300 of the technology are illustrated in which a received gesture includes a single point initiation touch on a first area (812), and a circular motion within the area (824). In such implementations, generating the signal comprises generating the signal associated with a brush of the instrument for the duration of the circular motion (864).

The invention claimed is:

1. A computer-implemented method comprising:
   receiving, on a touchscreen of an electronic device, a gesture comprising a single point initiation touch on a first area of the touchscreen and a drag into a second area of the touchscreen, where the first and second areas represent one or more percussion instruments;
   generating a first percussion instrument signal associated with the first area upon receiving the single point initiation touch; and
   generating a second percussion instrument signal associated with the second area in response to the drag entering into the second area.

2. A computer-implemented method comprising:
   receiving, on a touchscreen of an electronic device, a gesture comprising a two-touch point initiation touch on an area of the touchscreen and a change in a distance between the two touch points, where the area represents a percussion instrument;
   generating a percussion instrument signal associated with the area upon receiving the two-touch point initiation touch; and
   changing a first parameter of the percussion instrument signal upon a change in the distance between the two touch points.

3. The computer-implemented method of claim 2 wherein: the first parameter comprises signal repeat rate.

4. The computer-implemented method of claim 2 wherein: after the initiation touch, the gesture further comprises translation of the two touch points substantially as a group along a first axis; and
   generating the signal further comprises changing a second parameter of the generated signal upon a translation of the group along the first axis.

5. The computer-implemented method of claim 4 wherein: the first parameter comprises signal repeat rate, and the second parameter comprises one of: signal volume, signal pitch, and signal reverb.

6. A computer-implemented method comprising:
   receiving, on a touchscreen of an electronic device, a gesture comprising a two point initiation touch on a first sub-area of an area of the touchscreen representing a single percussion instrument, where the first sub-area represents a first strike of the represented percussion instrument that is different than a second strike represented by a second sub-area of the area of the touchscreen, and wherein the gesture includes moving the two points to change volume or pitch of a percussion instrument signal associated with the first sub-area; and
   generating the percussion instrument signal associated with the first sub-area.

7. The computer-implemented method of claim 6 wherein the single percussion instrument is a snare drum, the first sub-area represents a snare strike, the second sub-area represents a side stick strike and a third sub-area of the area represents a rim shot.

8. A computer-implemented method comprising:
   receiving, on a touchscreen of an electronic device, a gesture comprising a single point initiation touch on an area of the touchscreen and a circular motion within the area, where the area represents a percussion instrument; and
   generating a percussion instrument signal associated with a brush of the percussion instrument for the duration of the circular motion.

9. A non-transitory computer program product for processing touchscreen gestures in an electronic percussion instrument, the computer program product comprising:
   a least one computer readable medium; and
   at least one program module, stored on the at least one medium, and operable, upon execution by at least one processor to:
   receive, on a touchscreen of an electronic device, a gesture comprising a single point initiation touch on a first area of the touchscreen and a drag into a second area of the touchscreen, where the first and second areas represent one or more percussion instruments;
   generate a first percussion instrument signal associated with the first area upon receiving the single point initiation touch; and
   generate a second percussion instrument signal associated with the second area in response to the drag entering into the second area.

10. A non-transitory computer program product for processing touchscreen gestures in an electronic percussion instrument, the computer program product comprising:
    receiving, on a touchscreen of an electronic device, a gesture comprising a two-touch point initiation touch on an area of the touchscreen and a change in a distance between the two touch points, where the area represents a percussion instrument;
    generating a percussion instrument signal associated with the area upon receiving the two-touch point initiation touch; and
    changing a first parameter of the percussion instrument signal upon a change in the distance between the two touch points.

11. The computer program product of claim 10 wherein: the first parameter comprises signal repeat rate.

12. The computer program product of claim 10 wherein: after the initiation touch, the gesture further comprises translation of the two touch points substantially as a group along a first axis; and
    generating the signal further comprises changing a second parameter of the generated signal upon a translation of the group along the first axis.

13. The computer program product of claim 12 wherein:
the first parameter comprises signal repeat rate, and
the second parameter comprises one of: signal volume, signal pitch, and signal reverb.

14. A non-transitory computer program product for processing touchscreen gestures in an electronic percussion instrument, the computer program product comprising:
receiving, on a touchscreen of an electronic device, a gesture comprising a two point initiation touch on a first sub-area of an area of the touchscreen representing a single percussion instrument, where the first sub-area represents a first strike of the represented percussion instrument that is different than a second strike represented by a second sub-area of the area of the touchscreen, and wherein the gesture includes moving the two points to change volume or pitch of a percussion instrument signal associated with the first sub-area; and
generating the percussion instrument signal associated with the first sub-area.

15. The computer program product of claim 14 wherein the single percussion instrument is a snare drum, the first sub-area represents a snare strike, the second sub-area represents a side stick strike and a third sub-area represents a rim shot.

16. A non-transitory computer program product for processing touchscreen gestures in an electronic percussion instrument, the computer program product comprising:
receiving, on a touchscreen of an electronic device, a gesture comprising a single point initiation touch on an area of the touchscreen and a circular motion within the area, where the area represents a percussion instrument; and
generating a percussion instrument signal associated with a brush of the percussion instrument for the duration of the circular motion.

17. A system for processing touchscreen gestures in an electronic percussion instrument, the system comprising:
at least one processor,
at least one computer readable medium in communication with the processor;
at least one program module, stored on the at least one medium, and operable to, upon execution by the at least one processor:
receiving, on a touchscreen of an electronic device, a gesture comprising a single point initiation touch on a first area of the touchscreen and a drag into a second area of the touchscreen, where the first and second areas represent one or more percussion instruments;
generating a first percussion instrument signal associated with the first area upon receiving the single point initiation touch; and
generating a second percussion instrument signal associated with the second area in response to the drag entering into the second area.

18. A system for processing touchscreen gestures in an electronic percussion instrument, the system comprising:
at least one processor,
at least one computer readable medium in communication with the processor;
at least one program module, stored on the at least one medium, and operable to, upon execution by the at least one processor:
receiving, on a touchscreen of an electronic device, a gesture comprising a two-touch point initiation touch on an area of the touchscreen and a change in a distance between the two touch points, where the area represents a percussion instrument;
generating a percussion instrument signal associated with the area upon receiving the two-touch point initiation touch; and
changing a first parameter of the percussion instrument signal upon a change in the distance between the two touch points.

19. The system of claim 18 wherein:
the first parameter comprises signal repeat rate.

20. The system of claim 18 wherein:
after the initiation touch, the gesture further comprises translation of the two touch points substantially as a group along a first axis; and
generating the signal further comprises changing a second parameter of the generated signal upon a translation of the group along the first axis.

21. The system of claim 20 wherein:
the first parameter comprises signal repeat rate, and the second parameter comprises one of: signal volume, signal pitch, and signal reverb.

22. A system for processing touchscreen gestures in an electronic percussion instrument, the system comprising:
at least one processor,
at least one computer readable medium in communication with the processor;
at least one program module, stored on the at least one medium, and operable to, upon execution by the at least one processor:
receiving, on a touchscreen of an electronic device, a gesture comprising a two point initiation touch on a first sub-area of an area of the touchscreen representing a single percussion instrument, where the first sub-area represents a first strike of the represented percussion instrument that is different than a second strike represented by a second sub-area of the area of the touchscreen, and wherein the gesture includes moving the two points to change volume or pitch of a percussion instrument signal associated with the first sub-area; and
generating the percussion instrument signal associated with the first sub-area.

23. The system of claim 22 wherein the single percussion instrument is a snare drum, the first sub-area represents a snare strike, the second sub-area represents a side stick strike and a third sub-area represents a rim shot.

24. A system for processing touchscreen gestures in an electronic percussion instrument, the system comprising:
at least one processor,
at least one computer readable medium in communication with the processor;
at least one program module, stored on the at least one medium, and operable to, upon execution by the at least one processor:
receiving, on a touchscreen of an electronic device, a gesture comprising a single point initiation touch on an area of the touchscreen and a circular motion within the area, where the area represents a percussion instrument; and
generating a percussion instrument signal associated with a brush of the percussion instrument for the duration of the circular motion.

* * * * *

UNITED STATES PATENT AND TRADEMARK OFFICE
CERTIFICATE OF CORRECTION

| | | |
|---|---|---|
| PATENT NO. | : 8,809,665 B2 | Page 1 of 1 |
| APPLICATION NO. | : 13/038308 | |
| DATED | : August 19, 2014 | |
| INVENTOR(S) | : Daniel P. Patterson | |

It is certified that error appears in the above-identified patent and that said Letters Patent is hereby corrected as shown below:

In the Claims

Column 8, Line 30 at Claim 9; replace:
"a least one computer readable medium; and" with
-- at least one computer readable medium; and --

Signed and Sealed this
Sixteenth Day of December, 2014

Michelle K. Lee
*Deputy Director of the United States Patent and Trademark Office*